US012638800B2

(12) United States Patent
Kidoura et al.

(10) Patent No.: US 12,638,800 B2
(45) Date of Patent: May 26, 2026

(54) IMAGE FORMING SYSTEM PERFORMING TEMPERATURE CONTROL OF SHEET LAMINATOR BASED ON OPERATION MODES OF THE IMAGE FORMING SYSTEM

(71) Applicants: Yasunobu Kidoura, Kanagawa (JP); Ryohsuke Akaishi, Kanagawa (JP); Satoshi Kuno, Tokyo (JP); Hirofumi Horita, Kanagawa (JP); Naohiro Yoshida, Kanagawa (JP)

(72) Inventors: Yasunobu Kidoura, Kanagawa (JP); Ryohsuke Akaishi, Kanagawa (JP); Satoshi Kuno, Tokyo (JP); Hirofumi Horita, Kanagawa (JP); Naohiro Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 33 days.

(21) Appl. No.: 18/667,313

(22) Filed: May 17, 2024

(65) Prior Publication Data

US 2024/0393725 A1 Nov. 28, 2024

(30) Foreign Application Priority Data

May 26, 2023 (JP) ................................. 2023-086916

(51) Int. Cl.
*G03G 15/00* (2006.01)

(52) U.S. Cl.
CPC ......... *G03G 15/6544* (2013.01); *G03G 15/50* (2013.01); *G03G 15/6582* (2013.01)

(58) Field of Classification Search
CPC ............... G03G 15/6544; G03G 15/50; G03G 2215/00864
See application file for complete search history.

(56) References Cited

U.S. PATENT DOCUMENTS 5,095,369 A * 3/1992 Ortiz .................. H04N 1/00954 399/85
7,684,722 B2 * 3/2010 Sawada .................. G03G 15/50 399/82

(Continued)

FOREIGN PATENT DOCUMENTS

JP H04103336 A 4/1992
JP 2004212567 A 7/2004

(Continued)

OTHER PUBLICATIONS

English translation of JP-2007160601-A.*

(Continued)

*Primary Examiner* — Arlene Heredia Ocasio
(74) *Attorney, Agent, or Firm* — Harness, Dickey & Pierce, P.L.C.

(57) ABSTRACT

An image forming system includes an image forming apparatus, a sheet laminator, a post-processing apparatus, and circuitry. The sheet laminator includes a heater. The sheet laminator applies heat and pressure on a two-ply sheet in which a sheet medium is inserted while conveying the two-ply sheet. The post-processing apparatus performs a task. The circuitry is to calculate a task time taken for the task performed by of the post-processing apparatus, and perform one of increasing a temperature of the heater of the sheet laminator while the post-processing apparatus performs the task or maintaining the temperature of the heater of the sheet laminator while the post-processing apparatus performs the task, based on the task time in a productivity mode.

8 Claims, 8 Drawing Sheets

(56) References Cited

U.S. PATENT DOCUMENTS

| | | | | |
|---|---|---|---|---|
| 2021/0387467 | A1* | 12/2021 | Asano | G06F 3/1217 |
| 2022/0289512 | A1 | 9/2022 | Takahashi et al. | |
| 2023/0244164 | A1 | 8/2023 | Kidoura et al. | |
| 2023/0256726 | A1 | 8/2023 | Kunieda et al. | |
| 2023/0264461 | A1 | 8/2023 | Kuno et al. | |
| 2023/0264491 | A1 | 8/2023 | Horita et al. | |
| 2023/0264909 | A1 | 8/2023 | Kawakami et al. | |
| 2023/0303352 | A1 | 9/2023 | Akaishi et al. | |

FOREIGN PATENT DOCUMENTS

| | | | | | |
|---|---|---|---|---|---|
| JP | 2006199475 | A | * | 8/2006 | |
| JP | 2007160601 | A | * | 6/2007 | |
| JP | 2007163559 | A | * | 6/2007 | |
| JP | 2011090068 | A | * | 5/2011 | G06F 3/1285 |
| JP | 2011121188 | A | | 6/2011 | |
| JP | 2013003734 | A | * | 1/2013 | |
| JP | 2013003747 | A | | 1/2013 | |
| JP | 2013228913 | A | | 11/2013 | |
| JP | 2021194877 | A | | 12/2021 | |
| JP | 2021194909 | A | | 12/2021 | |
| JP | 2022138826 | A | | 9/2022 | |

OTHER PUBLICATIONS

English translation of JP-2006199475-A.*
English translation of JP-2011090068-A.*
English translation of JP-2007163559-A.*

* cited by examiner

IMAGE FORMING SYSTEM PERFORMING TEMPERATURE CONTROL OF SHEET LAMINATOR BASED ON OPERATION MODES OF THE IMAGE FORMING SYSTEM

CROSS-REFERENCE TO RELATED APPLICATION

This patent application is based on and claims priority pursuant to 35 U.S.C. § 119 (a) to Japanese Patent Application No. 2023-086916, filed on May 26, 2023, in the Japan Patent Office, the entire disclosure of which is hereby incorporated by reference herein.

BACKGROUND

Technical Field

Embodiments of the present disclosure relate to an image forming system.

Background Art

Typical image forming apparatuses such as printers or copiers include a fixing device having a fixing roller to apply heat and pressure to a toner image formed on a recording medium to fix the image to the recording medium. An image forming apparatus in the related art has a lamination mode that passes a two-ply sheet (for example, a lamination film) having two sheets overlaid and bonded together at one ends and performs a process (sheet lamination) on the two-ply sheet.

Further, a typical post-processing apparatus that performs casework has been proposed to heat an adhesive for casework in advance as a preparation for post-processing, and to heat the adhesive to a predetermined temperature as a preparation operation at the time of power ON, job reception, or energy-saving recovery.

For example, an image forming apparatus in the related art has a configuration in which heating is started in accordance with the completion time of the printing process of the preceding job in order to shorten the preparation time for using the post-processing apparatus. Further, another image forming apparatus in the related art has a configuration in which the power-saving control of the system is not performed when the preparation for starting the normal operation is performed, in order not to interrupt the preparation of the post-processing apparatus in the middle of the process of the preparation.

SUMMARY

Embodiments of the present disclosure described herein provide a novel image forming system including an image forming apparatus, a sheet laminator, a post-processing apparatus, and circuitry. The sheet laminator includes a heater. The sheet laminator applies heat and pressure on a two-ply sheet in which a sheet medium is inserted while conveying the two-ply sheet. The post-processing apparatus performs a task. The circuitry is to calculate a task time taken for the task performed by of the post-processing apparatus, and perform one of increasing a temperature of the heater of the sheet laminator while the post-processing apparatus performs the task or maintaining the temperature of the heater of the sheet laminator while the post-processing apparatus performs the task, based on the task time in a productivity mode.

BRIEF DESCRIPTION OF THE SEVERAL VIEWS OF THE DRAWINGS

Exemplary embodiments of this disclosure will be described in detail based on the following figures, wherein.

Figure 1:
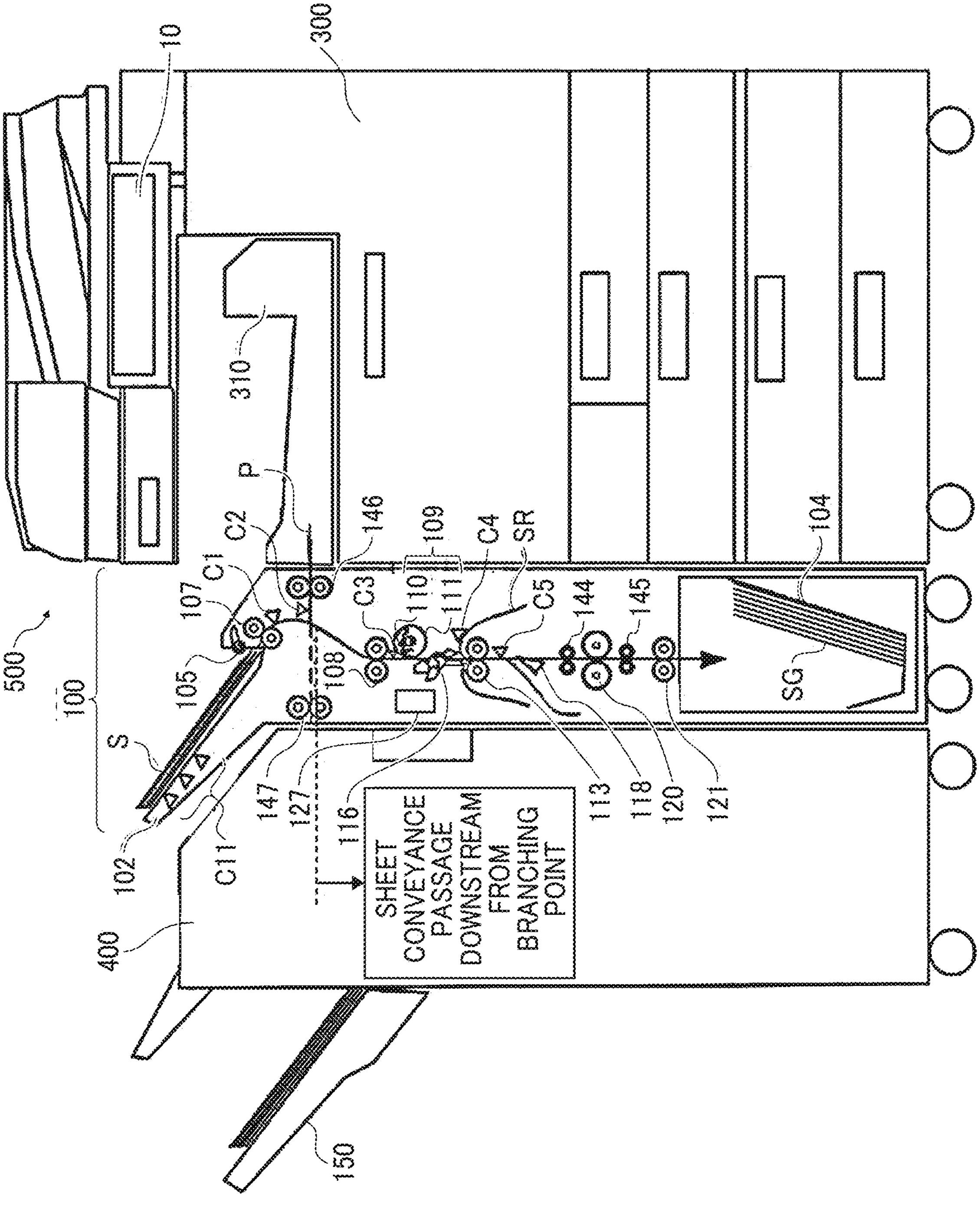
FIG. 1 is a schematic diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a schematic diagram illustrating an overall configuration of an image forming system according to an embodiment of the present disclosure.

The image forming system 500 includes an image forming apparatus 300, a relay device 310, a sheet laminator 100, and a post-processing apparatus 400.

The image forming system 500 according to the present embodiment feeds an inner sheet P, on which an image is formed by the image forming apparatus 300, from the sheet laminator 100 via the relay device 310. The post-processing apparatus 400 functioning as a post-processing apparatus other than the sheet laminator 100 is disposed downstream from the sheet laminator 100 in a sheet conveyance direction.

The sheet laminator 100 includes a sheet tray 102 on which lamination sheets S are stacked, and receives inner sheets P fed from the image forming apparatus 300 to the sheet laminator 100 via the relay device 310. Accordingly, the image forming apparatus 300 (e.g., a printer or a copier) can insert an inner sheet P on which an image is formed into the lamination sheet S in an in-line system. Thus, the image forming system 500 can perform a series of operations of, in this order, the feeding of the lamination sheet S, the separation of the lamination sheet S, the insertion of the inner sheet P into the lamination sheet S, and the sheet laminating operation by application of heat and pressure without using manpower.

Further, the post-processing apparatus 400 is disposed downstream from the sheet laminator 100 in the sheet conveyance direction. When a print job is not to perform the sheet laminating operation and is to perform another post-processing operation (e.g., the binding operation or the sheet folding operation), the image forming system 500 causes a sheet (i.e., the inner sheet P) conveyed from the image forming apparatus 300 to simply pass through the sheet laminator 100 to convey the sheet (i.e., the inner sheet P) to the post-processing apparatus 400. Accordingly, the post-processing apparatus 400 can perform the post-processing operation on the sheet (i.e., the inner sheet P). As a result, the image forming system 500 can be used according to the needs of the user without reducing the efficiency.

A control panel 10 is disposed in an exterior portion of the image forming apparatus 300. The control panel 10 functions serves as a display operation device to display information in the image forming apparatus 300 and receives an operation input by a user. The control panel 10 also functions as a notification device to output a perceptual signal to a user. Alternatively, a notification device other than the control panel 10 may be separately disposed in the image forming apparatus 300.

Figure 2:
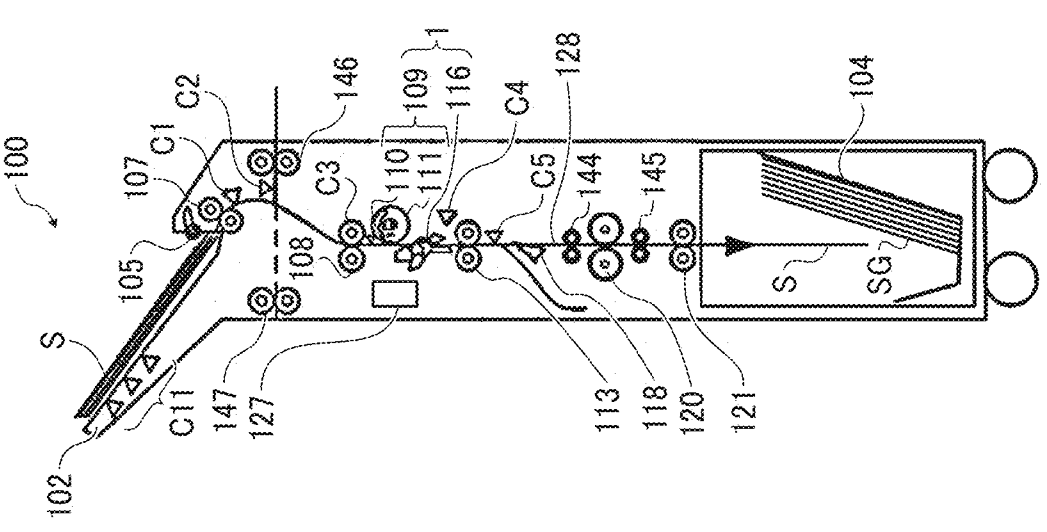
FIG. 2 is a diagram illustrating an overall configuration of a sheet laminator included in the image forming system of FIG. 1.

FIG. 2 is a diagram illustrating an overall configuration of a sheet laminator included in the image forming system of FIG. 1.

The sheet laminator 100 according to the present embodiment is to separate two sheets (plies) of a two-ply sheet (referred to as a "lamination sheet S") and to insert and sandwich (nip) a sheet medium (referred to as an "inner sheet P") between the separated two sheets of the two-ply sheet.

The lamination sheet S is a two-ply sheet constructed of two overlapping sheets (plies) and bonded (or joined) at one portion (or on one side). For example, a two-ply sheet has two sheets (two sides). A first side of the two-ply sheet functions as a transparent sheet such as a transparent polyester sheet, a second side of the two-ply sheet functions as a transparent or opaque sheet disposed facing the first side, and the first and second sides are bonded at one side of the two-ply sheet. The two-ply sheet also includes a lamination film.

The inner sheet P is an example of a sheet medium to be inserted into the two-ply sheet. Examples of the sheet medium include thick paper, postcards, envelopes, plain paper, thin paper, coated paper, art paper, tracing paper, and overhead projector (OHP) transparencies.

As illustrated in FIG. 2, the sheet laminator 100 includes a sheet tray 102 functioning as a first stacker that stacks lamination sheets S, a pickup roller 105 that feeds the lamination sheets S from the sheet tray 102, and a first conveyance roller pair 107. The sheet tray 102 of the sheet laminator 100 includes multiple size-detection sensors C11 for detecting the size of the lamination sheet S.

A lamination sheet S to which an inner sheet P has been inserted is ejected and stacked on the sheet ejection tray 104 by a third conveyance roller pair 113 or a roller disposed downstream from the third conveyance roller pair 113 in the sheet conveyance direction. The sheet ejection tray 104 is disposed inside the housing of the sheet laminator 100. Such a configuration facilitates a vertical conveyance of the lamination sheet S toward the sheet ejection tray 104.

A conveyance sensor C1 is disposed downstream from the first conveyance roller pair 107 in the sheet conveyance direction to detect the sheet conveyance position of the lamination sheet S.

A conveyance sensor C2 is disposed downstream from an entrance roller pair 146 and upstream from an exit roller pair 147 in the sheet conveyance direction to detect the sheet conveyance position of the inner sheet P.

The sheet laminator 100 further includes, for example, a second conveyance roller pair 108, a winding roller 109 functioning as a rotator, a third conveyance roller pair 113, a fourth conveyance roller pair 144, a fifth conveyance roller pair 145, an ejection roller pair 121, and the sheet ejection tray 104, disposed downstream from the first conveyance roller pair 107 in the sheet conveyance direction. The sheet laminator 100 further includes separation members 116 disposed between the winding roller 109 and the third conveyance roller pair 113. The separation members 116 are movably disposed in the width direction of the lamination sheet S. Each of the separation members 116 functions as a separator that separates the lamination sheet S according to the present embodiment.

A conveyance sensor C3 is disposed downstream from the second conveyance roller pair 108 in the sheet conveyance direction to detect the conveyance position of the lamination sheet S and the conveyance position of the inner sheet P.

An abnormal condition detection sensor C4 is disposed downstream from the winding roller 109 in the sheet conveyance direction to detect the condition of the lamination sheet S.

A conveyance sensor C5 that detects the conveyance position of the lamination sheet S is disposed downstream from the third conveyance roller pair 113 in the sheet conveyance direction.

The pickup roller 105, the first conveyance roller pair 107, the second conveyance roller pair 108, and the winding roller 109 are some examples of a first feeder.

In FIG. 2, each set of the second conveyance roller pair 108 and the third conveyance roller pair 113 is, for example, a pair of two rollers and is rotationally driven by a drive device (e.g., a motor). The second conveyance roller pair 108 rotates in one direction. The third conveyance roller pair 113 rotates in forward and reverse directions. Due to such a configuration, the lamination sheet S and the inner sheet P are nipped and conveyed.

The second conveyance roller pair 108 conveys the lamination sheet S and the inner sheet P vertically downward toward the third conveyance roller pair 113.

On the other hand, the third conveyance roller pair 113 can switch the direction of rotation between the forward conveyance direction and the opposite direction that is opposite to the forward conveyance direction. The third conveyance roller pair 113 can nip and convey the lamination sheet S vertically downward toward the sheet ejection tray 104 and also convey the lamination sheet S vertically upward toward the winding roller 109 in the opposite direction that is a direction to pull back the lamination sheet S.

The sheet laminator 100 further includes a sheet separation device 1 between the second conveyance roller pair 108 and the third conveyance roller pair 113. The sheet separation device 1 includes the winding roller 109 functioning as a rotator and the separation members 116. The winding roller 109 is driven by a winding roller motor 109*a* (see FIG. 5) that functions as a drive unit to rotate the winding roller 109 in the forward and opposite directions. The direction of rotation of the winding roller 109 is switchable between the forward direction (clockwise direction) and the opposite direction (counterclockwise direction).

The winding roller 109 includes a roller 111 and a sheet gripper 110 movably disposed on the roller 111 to grip the sheet S. The sheet gripper 110 is driven by a sheet gripper motor 110*a* (see FIG. 5) to be rotatable with the roller 111. The sheet gripper 110 grips the leading end of the lamination sheet S with the roller 111. In the present embodiment, the sheet gripper 110 and the roller 111 are separate units. However, the sheet gripper 110 may be formed on the outer circumference of the roller 111 as a single unit functioning as a handle.

A description is now given of a series of operations performed in the sheet laminator 100, with reference to FIG. 2.

The series of operations performed by the sheet laminator 100 indicates the operations from separating the lamination sheet S to inserting the inner sheet P into the lamination sheet S.

In FIG. 2, the lamination sheets S are stacked on the sheet tray 102 such that the bonded side is disposed downstream from the pickup roller 105 in the sheet feeding direction (the sheet conveyance direction) of the lamination sheet S. The sheet laminator 100 picks the lamination sheet S stacked on the sheet tray 102 by the pickup roller 105 and conveys the lamination sheet S toward the first conveyance roller pair 107.

The lamination sheet S is then conveyed toward the winding roller 109 by the second conveyance roller pair 108 disposed downstream from the first conveyance roller pair 107 in the sheet conveyance direction. In the sheet laminator 100, the second conveyance roller pair 108 conveys the lamination sheet S with the bonded end, which is one of four sides of the lamination sheet S, as a downstream end in the vertical direction (i.e., a vertically downward direction).

Subsequently, when the trailing end of the lamination sheet S in the vertical direction (i.e., the vertically downward direction) passes by the winding roller 109, the sheet laminator 100 temporarily stops the conveyance of the lamination sheet S.

The sheet laminator 100 then opens the sheet gripper 110, reverses the rotation direction of the third conveyance roller pair 113, and conveys the lamination sheet S vertically upward toward the opening of the sheet gripper 110.

Subsequently, the sheet laminator 100 stops rotation of the third conveyance roller pair 113 to stop conveyance of the lamination sheet S when the trailing end of the lamination sheet S is inserted into the opened portion of the sheet gripper 110, and closes the sheet gripper 110 to grip the trailing end of the lamination sheet S. These operations are performed when the lamination sheet S is conveyed by the designated amount.

The sheet laminator 100 then rotates the winding roller 109 in the clockwise direction to wind the lamination sheet S around the winding roller 109. The lamination sheet S is wound around the winding roller 109 from the side where the two overlapping sheets of the lamination sheet S are not bonded.

When the lamination sheet S that is the two-ply sheet is wound around the winding roller 109, a winding circumferential length difference (in other words, a winding circumferential amount difference) is created between the two sheets in the amount of winding of the lamination sheet S around the circumference of the winding roller 109. There is a surplus of the sheet on the inner circumferential side to the center of the winding roller 109, which generates a slack toward the bonded end. As a result, a space is created between the two sheets of the two-ply sheet. As the separation members 116 are inserted into the generated space from both sides of the lamination sheet S, the space between the two sheets can be reliably maintained. In response to the detection of the leading end of the lamination sheet S with the sheet conveyance sensor C5, the lamination sheet S is conveyed from the sheet conveyance sensor C5 by a designated amount to perform these operations.

The sheet laminator 100 rotates the winding roller 109 counterclockwise in a state where the separation members 116 are inserted into the space generated in the lamination sheet S, and moves the space where the lamination sheet S is separated to the trailing end of the lamination sheet S in the vertical direction (i.e., the vertically downward direction). After the winding roller 109 has been rotated by a designated amount, the sheet laminator 100 causes the sheet gripper 110 to open. As a result, the trailing end of the lamination sheet S is separated into the upper and lower sheets at the trailing end.

In this state, the sheet laminator 100 causes the driver to temporarily stop the conveyance of the lamination sheet S and to further move the separation members 116 in the width direction of the lamination sheet S from both ends toward the center to separate the whole area of the trailing end of the lamination sheet S. In response to the detection of the leading end of the lamination sheet S with the sheet conveyance sensor C5, the lamination sheet S is conveyed from the sheet conveyance sensor C5 by a designated amount to perform these operations.

The sheet laminator 100 then rotates the third conveyance roller pair 113 counterclockwise to convey the lamination sheet S in the reverse conveyance direction opposite to the forward conveyance direction. A branching member 118 can be switched at the time when the leading end of the lamination sheet S passes through the conveyance sensor C5. When the lamination sheet S is conveyed to the non-thermal pressure conveyance passage, the branching member 118 remains at the position illustrated in FIG. 1. When the lamination sheet S is to be conveyed to a thermal pressure conveyance passage 128, the branching member 118 is switched to the side where the lamination sheet S is guided to the thermal pressure conveyance passage 128.

The separation members 116 guide the two sheets separated from the lamination sheet S in the right and left directions in FIG. 1, and thus the two sheets are completely separated. Then, the sheet laminator 100 temporarily stops the conveyance of the lamination sheet S and brings the bonded portion of the lamination sheet S into a state of being gripped (nipped) by the third conveyance roller pair 113. Accordingly, one end of the lamination sheet S is bonded as the bonded side of the lamination sheet S and the other end of the lamination sheet S is opened largely.

In response to the detection of the leading end of the lamination sheet S with the sheet conveyance sensor C5, the lamination sheet S is conveyed from the sheet conveyance sensor C5 by a designated amount to perform these operations.

The sheet laminator 100 then rotates the second conveyance roller pair 108 to convey the inner sheet P conveyed from the image forming apparatus side vertically downward toward the third conveyance roller pair 113.

Subsequently, the sheet laminator 100 rotates the third conveyance roller pair 113 to merge the lamination sheet S and the inner sheet P, and inserts the inner sheet P into the opened lamination sheet S.

The operation from separation (peeling) of the lamination sheet S to insertion of the inner sheet P has been described above. The state of the opened lamination sheet S is illustrated in FIG. 1.

The sheet laminator 100 then causes the third conveyance roller pair 113 to convey the lamination sheet S, in which the inner sheet P has been inserted, downward in the vertical direction. Thus, the two sheets of the lamination sheet S overlap again and the opening of the lamination sheets S is closed. The lamination sheet S in which the inner sheet P has been sandwiched is conveyed to a fixing device having a thermal pressure roller pair 120 (corresponding to a fuser pressure member) as a pair of rollers by the third conveyance roller pair 113 or, for example, a roller disposed downstream from the third conveyance roller pair 113 in the sheet conveyance direction of the lamination sheet S.

When passing through the thermal pressure roller pair 120, the lamination sheet S is thermally pressed and fixed. After passing through the thermal pressure roller pair 120, the lamination sheet S continues to be conveyed vertically downward toward the sheet ejection tray 104 and is stacked on the sheet ejection tray 104. Since the lamination sheet S pressed after passing through the thermal pressure roller pair 120 is ejected vertically downward in this manner, the lamination sheet S can be stacked on the sheet ejection tray 104 while preventing the heated lamination sheet S from being bent by an external force.

More specifically, in the vertical conveyance according to the present embodiment, the lamination sheet S is ejected vertically downward. Accordingly, the gravity applied to the lamination sheet S is parallel to the tangent line of a fixing nip between the rollers of the thermal pressure roller pair 120, and an external force that may deform the lamination sheet S is not applied to the lamination sheet S. Thus, as long as the lamination sheet S continues to be ejected vertically, deformation of the lamination sheet S is reduced. The sheet ejection tray 104 is disposed after the trailing end of the lamination sheet S passes through the thermal pressure roller pair 120 and the ejection roller pair 121, and the lamination sheet S is cooled before reaching the sheet ejection tray 104. Accordingly, the inclination of the stacking surface of the sheet ejection tray 104 does not apply an external force that may deform the lamination sheet S to the lamination sheet S.

As the lamination sheet S is conveyed vertically downward, the lamination sheet S continues to be conveyed vertically downward until the leading end of the lamination sheet S reaches the thermal pressure roller pair 120 and the trailing end of the lamination sheet S completely passes through the thermal pressure roller pair 120. Accordingly, the vertical conveyance of the lamination sheet S is given, thus preventing the bending of the thermally-pressed lamination sheet S due to the external force.

The sheet laminator 100 can perform a series of operations from feeding and separation of the lamination sheet S, insertion of the inner sheet P, and sheet lamination with heat and pressure on a stand-alone basis. This series of operations is carried out automatically without any aid of a user. For this reason, the sheet laminator 100 can enhance and provide the convenience better than a known sheet laminator employing a known technique. Since the sheet laminator 100 includes the fixing device including the thermal pressure roller pair 120 and can perform a sheet laminating operation, the sheet laminator 100 may be referred to as a lamination processing apparatus in a narrow sense.

Figure 3:
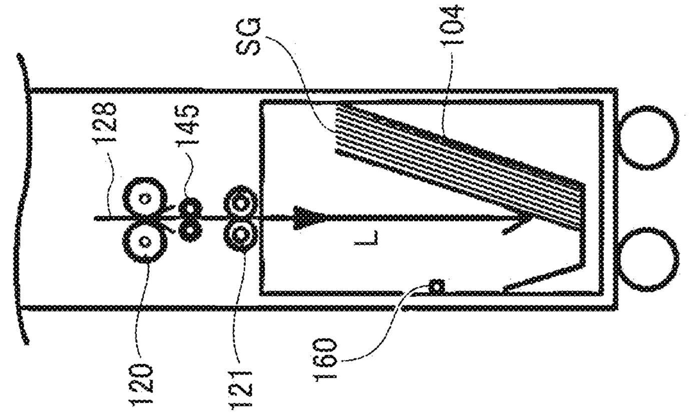
FIG. 3 is an enlarged view of a part of the sheet laminator, from a thermal pressure roller pair to a sheet ejection tray, according to an embodiment of the present disclosure.

FIG. 3 is an enlarged view of a part of the sheet laminator, from a thermal pressure roller pair to a sheet ejection tray, according to an embodiment of the present disclosure.

In this example, multiple lamination sheets (laminated sheets SG) are stacked on the sheet ejection tray 104. As illustrated in FIG. 2, a distance L from the fixing nip region of the thermal pressure roller pair 120 to the stacking surface of the sheet ejection tray 104 or the uppermost surface of the laminated sheets SG stacked on the sheet ejection tray 104 on an extension line of a sheet conveyance passage is longer than the length of the lamination sheet S in the sheet conveyance direction. Accordingly, the leading end of the lamination sheet S does not contact the stacking surface of the sheet ejection tray 104 or the stacked laminated sheets SG until the trailing end of the lamination sheet S completely passes through the thermal pressure roller pair 120, thus preventing the heated lamination sheet S from being bent by an external force.

The sheet ejection tray 104 can stack lamination sheets S up to a thickness of, for example, 50 mm. In order to detect the full state of the laminated sheets SG, a tray full detection sensor 160 (e.g., a laser displacement meter) that serves as an optical sensor to detect the uppermost surface of the stacked laminated sheets SG is provided with the sheet ejection tray 104. In this case, the distance L is longer than the length of the lamination sheet S in the sheet conveyance direction at least up to the thickness of 50 mm of laminated sheets SG.

Figure 4:
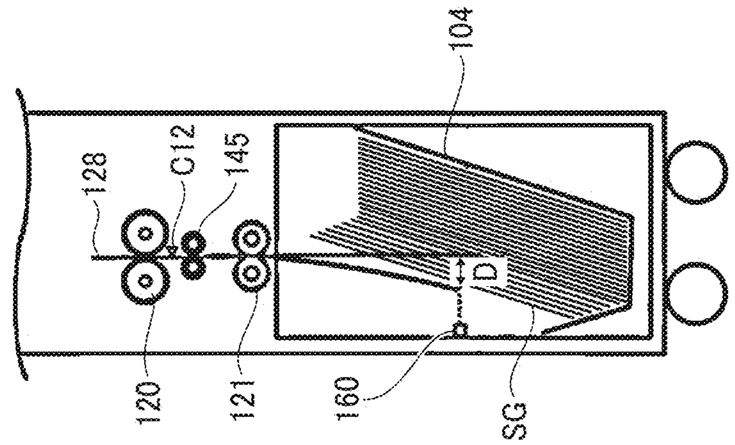
FIG. 4 is another enlarged view of the part of the sheet laminator, from the thermal pressure roller pair to the sheet ejection tray, subsequent to FIG. 3.

FIG. 4 is another enlarged view of the part of the sheet laminator, from the thermal pressure roller pair to the sheet ejection tray, subsequent to FIG. 3.

In this example, more sheets (laminated sheets SG) than in the example illustrated in FIG. 3 are stacked on the sheet ejection tray 104. As illustrated in FIG. 3, when the leading end of the lamination sheet S during sheet ejection from the ejection roller pair 121 contacts the uppermost surface of the laminated sheets SG after fixing in the sheet ejection tray 104, the lamination sheet S is bent.

The sheet laminator 100 has a configuration in which a distance D between a contact point of the leading end of the lamination sheet S during sheet ejection and the uppermost surface of the laminated sheets SG and a vertical line passing through the nip region of the ejection roller pair 121 is equal to or less than 30 mm. For example, the tray full detection sensor 160 (for example, a laser-displacement meter) is disposed at the sheet ejection tray 104 to detect the distance to the uppermost sheet of the stacked laminated sheets SG that is at a position where the distance D is 30 mm. Such a configuration can determine whether the distance D is equal to or less than 30 mm.

Setting the distance D to be equal to or less than 30 mm can reduce the bending of the lamination sheet S and enhance the stacking performance, even if the leading end of the lamination sheet S contacts the uppermost surface of the laminated sheets SG during sheet ejection of the lamination sheet S. When the tray full detection sensor 160 detects that the distance D exceeds 30 mm, the sheet laminator 100 determines that the sheet ejection tray 104 is full, and stops fixing and conveying the lamination sheet S. Preventing the distance D from exceeding 30 mm in this manner can prevent the lamination sheet S from being largely bent when the leading end of the lamination sheet S contacts the uppermost surface of the laminated sheets SG during sheet ejection of the lamination sheet S. Note that the numerical value "30 mm" is merely an example, and is a numerical value determined by evaluating in advance the thickness of the lamination sheet S and the inner sheet P to be used depending on the specifications of the sheet laminator.

As illustrated in FIGS. 1 to 4, the ejection roller pair 121 that ejects the lamination sheet S toward the sheet ejection tray 104 are disposed downstream from the thermal pressure roller pair 120 in the sheet conveyance direction. Ejecting the lamination sheet S by the ejection roller pair 121 can reduce the formation of wrinkles on the lamination sheet S after thermal pressing operation. Ejecting the lamination sheet S in the vertical direction by the ejection roller pair 121 can reduce bending of the lamination sheet S after the thermal pressing operation.

Figure 5:
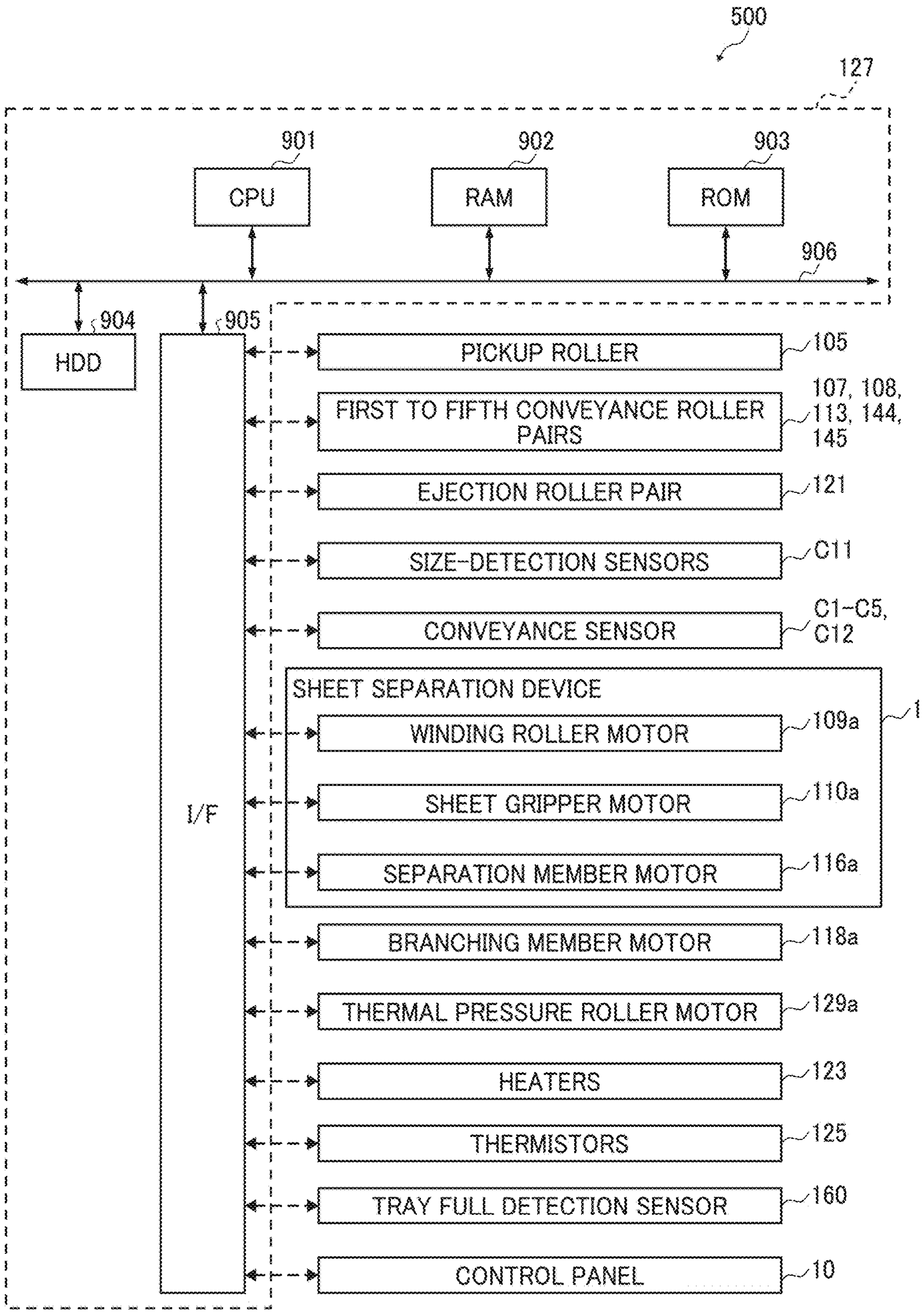
FIG. 5 is a diagram illustrating a hardware configuration of a control block for controlling the operations of the image forming system of FIG. 1.

FIG. 5 is a diagram illustrating a hardware configuration of a control block for controlling the operations of the image forming system of FIG. 1.

As illustrated in FIG. 5, the image forming system 500 includes a central processing unit (CPU) 901, a random access memory (RAM) 902, a read only memory (ROM) 903, a hard disk drive (HDD) 904, and an interface (I/F) 905 coupled to each other via a common bus 906.

The CPU 901, the RAM 902, the ROM 903, the HDD 904, and the I/F 905 are connected to each other.

The CPU 901 is an arithmetic unit and controls the overall operation of the image forming system 500.

The RAM 902 is a volatile storage medium that allows data to be read and written at high speed. The CPU 901 uses the RAM 902 as a work area for data processing.

The ROM 903 is a read-only non-volatile storage medium that stores programs such as firmware.

The HDD 904 is a non-volatile storage medium that allows data to be read and written and has a relatively large storage capacity. The HDD 904 stores, e.g., an operating system (OS), various control programs, and application programs.

The image forming system 500 processes, by an arithmetic function of the CPU 901, e.g., a control program stored in the ROM 903 and an information processing program (or application program) loaded into the RAM 902. Such processing configures a software controller including various functional modules of the image forming system 500. The software controller thus configured cooperates with hardware resources of the image forming system 500 construct functional blocks to implement functions of the image forming system 500.

In other words, the CPU 901, the RAM 902, the ROM 903, the HDD 904, and the I/F 905 implement a controller 127 (a control unit) to control the operation of the image forming system 500.

The I/F 905 is an interface that connects the pickup roller 15, the first conveyance roller pair 107, the second conveyance roller pair 108, the third conveyance roller pair 113, the fourth conveyance roller pair 144, the fifth conveyance roller pair 145, the ejection roller pair 121, the size detection sensors C11, the conveyance sensors C1, C2, C3, C4, C5, and C12, the winding roller motor 109*a*, the sheet gripper motor 110*a*, a separation member motor 116*a*, a branching member motor 118*a*, a thermal pressure roller motor 129*a*, heaters 123 (corresponding to the heating device), thermistors 125 (corresponding to the temperature sensor), the tray full detection sensor 160, and the control panel 10 to the common bus 906.

The controller 127 controls the operations of the pickup roller 15, the first conveyance roller pair 107, the second conveyance roller pair 108, the third conveyance roller pair 113, the fourth conveyance roller pair 144, the fifth conveyance roller pair 145, the ejection roller pair 121, the winding roller motor 109*a*, the sheet gripper motor 110*a*, the separation member motor 116*a*, the branching member motor 118*a*, the thermal pressure roller motor 129*a*, and the heaters 123, via the I/F 905. In addition, the controller 127 acquires detection results of the size detection sensor C11, the conveyance sensors C1, C2, C3, C4, C5, and C12, the thermistors 125, and the tray full detection sensor 160 via the I/F 905.

The winding roller motor 109*a* is a driver to drive the winding roller 109 in the forward and reverse directions. The sheet gripper motor 110*a* is a driver to rotate the sheet gripper 110. The separation member motor 116*a* is a drive unit to move the separation members 116 in the width direction of the lamination sheet S. The branching member motor 118*a* is a driver to switch the position of the branching member 118.

Figure 6:
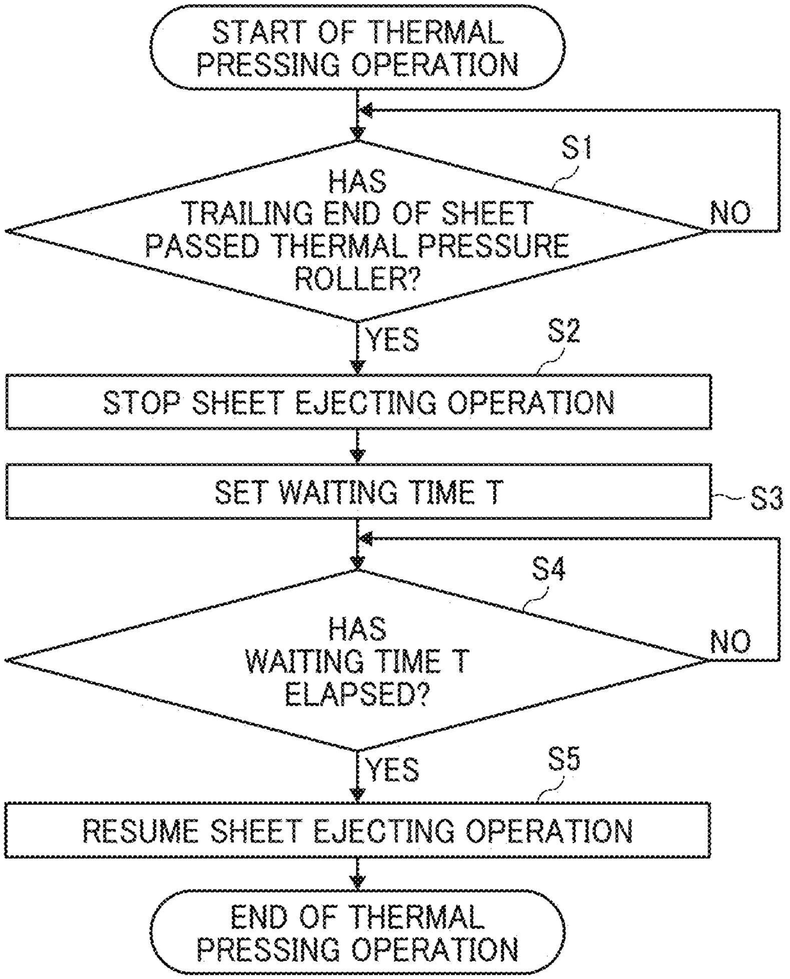
FIG. 6 is a flowchart of a sheet ejection process of the sheet laminator, according to an embodiment of the present disclosure.

FIG. 6 is a flowchart of a sheet ejection process of the sheet laminator, according to an embodiment of the present disclosure.

After the start of a thermal pressing operation in the fixing device that includes the thermal pressure roller pair 120, the sheet laminator 100 determines whether the trailing end of the lamination sheet S has passed through the thermal pressure roller pair 120, in step S1. For this determination, the sheet laminator 100 includes a detector (sensor) that detects the lamination sheet S, and the detector is, for example, the conveyance sensor C12 (see FIG. 4) disposed downstream from the thermal pressure roller pair 120 in the sheet conveyance direction of the lamination sheet S.

When the trailing end of the lamination sheet S completely passes through the thermal pressure roller pair 120 (YES in step S1), the sheet laminator 100 stops the sheet ejecting operation of the lamination sheet S in step S2, and holds the lamination sheet S by the ejection roller pair 121. Then in step S3, a timer in the sheet laminator 100 sets a waiting time T based on the size of the lamination sheet S detected by the size detection sensors C11, and the controller 127 determines whether the waiting time T has elapsed, in step S4. When the waiting time T has not elapsed (NO in step S4), step S4 is repeated until the waiting time T elapses. When the waiting time T has elapsed (YES in step S4), the sheet laminator 100 resumes the sheet ejecting operation of the lamination sheet S in step S5, and ejects the lamination sheet S.

As described above, the sheet laminator 100 stops the ejection roller pair 121, holds the lamination sheet S by the ejection roller pair 121, and performs the sheet ejecting operation after waiting for the waiting time T (required time) to elapse. Accordingly, the lamination sheet S is ejected after waiting for a decrease of the temperature of the thermally-pressed lamination sheet S, thus reducing the bending of the lamination sheet S.

Figure 7:
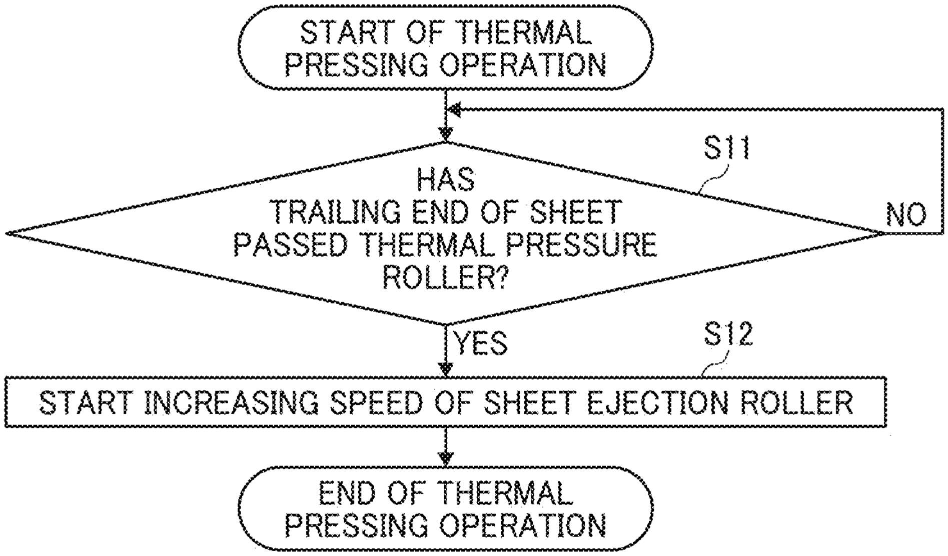
FIG. 7 is a flowchart of another sheet ejection process of the sheet laminator, according to an embodiment of the present disclosure.

FIG. 7 is a flowchart of another sheet ejection process of the sheet laminator, according to an embodiment of the present disclosure.

After the start of a thermal pressing operation in the fixing device that includes the thermal pressure roller pair 120, the sheet laminator 100 determines whether the trailing end of the lamination sheet S has passed through the thermal pressure roller pair 120, in step S11. For this determination, the sheet laminator 100 includes a detector (sensor) that detects the lamination sheet S, and the detector is, for example, the conveyance sensor C12 (see FIG. 4) disposed downstream from the thermal pressure roller pair 120 in the sheet conveyance direction of the lamination sheet S.

When the trailing end of the lamination sheet S has not completely passed through the thermal pressure roller pair 120 (NO in step S11), step S11 is repeated until the trailing end of the lamination sheet S completely passes through the thermal pressure roller pair 120. When the trailing end of the lamination sheet S has completely passed through the thermal pressure roller pair 120 (YES in step S11), the sheet laminator 100 increases the rotation speed of the ejection roller pair 121 in step S12 to increase the conveyance speed of the lamination sheet S. Accordingly, the time during which the leading end of the thermally-pressed lamination sheet S contacts the stacking surface of the sheet ejection tray 104 or the uppermost surface of the stacked sheets SG is shortened, and thus the bending of the lamination sheet S can be reduced.

Figure 8:
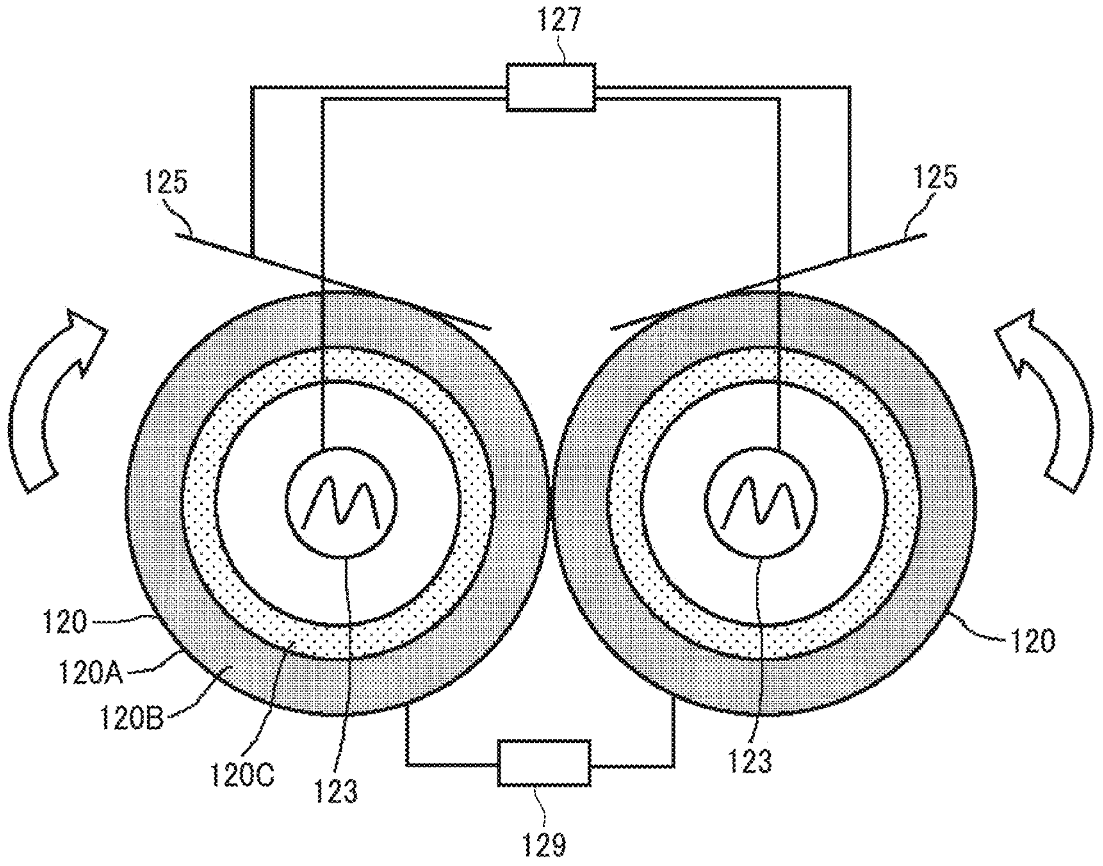
FIG. 8 is a schematic view of a fixing unit including the thermal pressure roller pair.

FIG. 8 is a schematic view of a fixing unit including the thermal pressure roller pair 120.

The thermal pressure roller pair 120 is a roller including a fluororesin layer (perfluoroalkoxy tube or PFA tube) 120A as a surface layer, a rubber layer 120B as an elastic layer disposed close to the heater 123 from the surface layer, and a core metal portion 120C at the center portion close to the heater 123 from the elastic layer. By using a fluororesin layer as the surface layer, dirt is less likely to adhere to the surface layer. However, since the fluororesin layer is easily damaged by heat, the continuous rotation operation of the thermal pressure roller pair 120 before stopping is required in some cases.

The thermal pressure roller pair 120 is formed as a pair of rollers between which a nip region for nipping the lamination sheet S is formed. The heater 123 functioning as a heating unit is disposed inside each of the rollers of the thermal pressure roller pair 120 to heat the thermal pressure roller pair 120.

The thermistors 125 each functioning as a temperature sensor are disposed facing the thermal pressure roller pair 120 at the entrance of the nip region to detect the temperature of the thermal pressure roller pair 120 that is heated. The thermistors 125 and the heaters 123 are connected to the controller 127. The controller 127 is an example of a temperature controller that controls the temperature of each of the heaters 123.

Further, a drive unit 129 (corresponding to the drive unit) that rotates the thermal pressure roller pair 120 is connected to the thermal pressure roller pair 120. The thermal pressure roller motor 129*a* (see FIG. 5) is an example of the drive unit 129.

A description is then given of the configuration of the sheet laminator according to an embodiment of the present disclosure.

According to an embodiment of the present disclosure, in a case where a command of sheet lamination is sent to the sheet laminator 100 while the post-processing apparatus 400 performs a task processing (in other words, while a sheet is ejected from the image forming apparatus 300 to the post-processing apparatus 400), the controller 127 controls the timing of increasing the temperature of the heater (for example, the heaters 123) of the sheet laminator 100.

Figures 9, 9A, 9B:
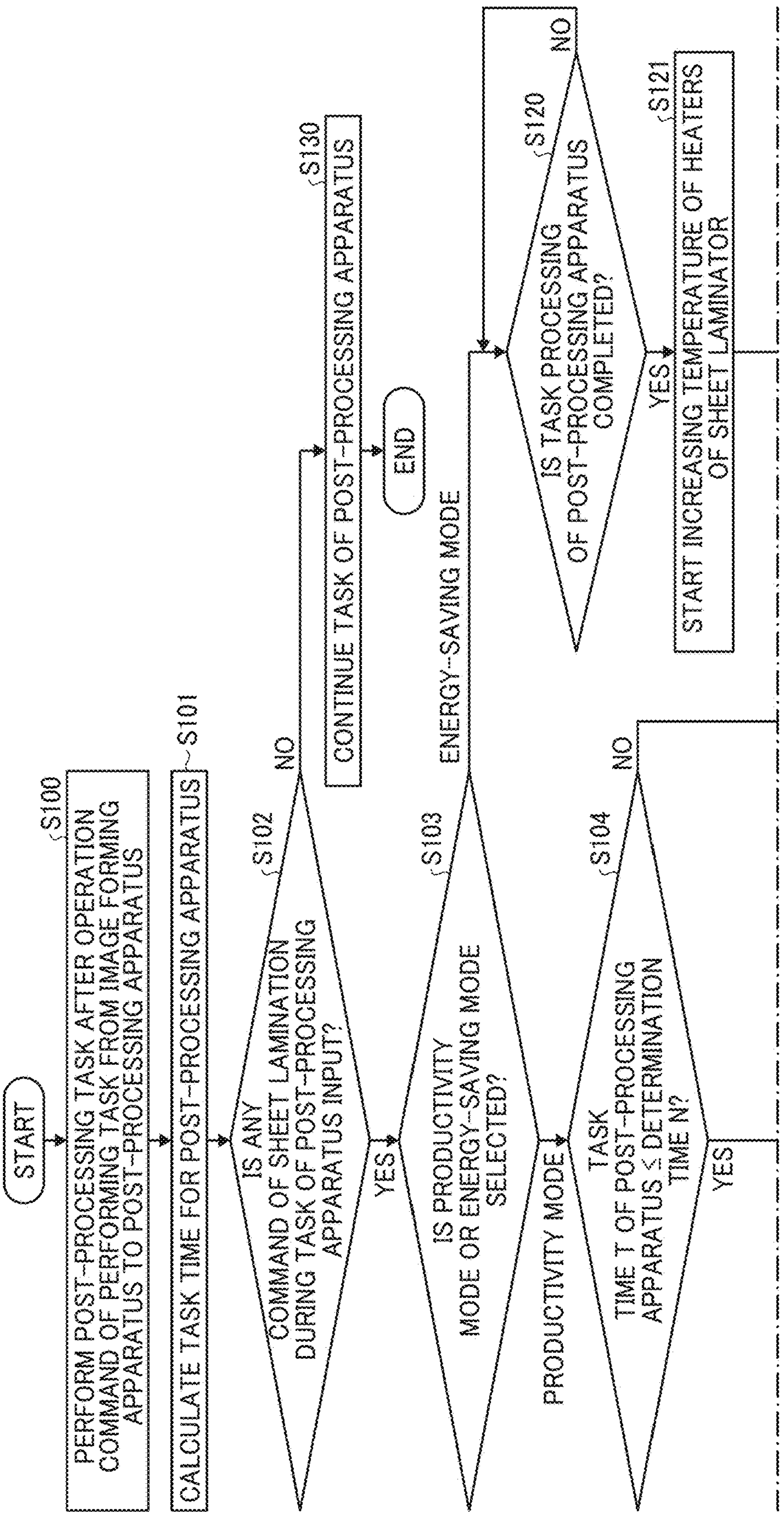
FIG. 9 including
FIGS. 9A and 9B is a flowchart of a temperature control of a heater of the sheet laminator in task processing in a post-processing apparatus.
Figure 9B:
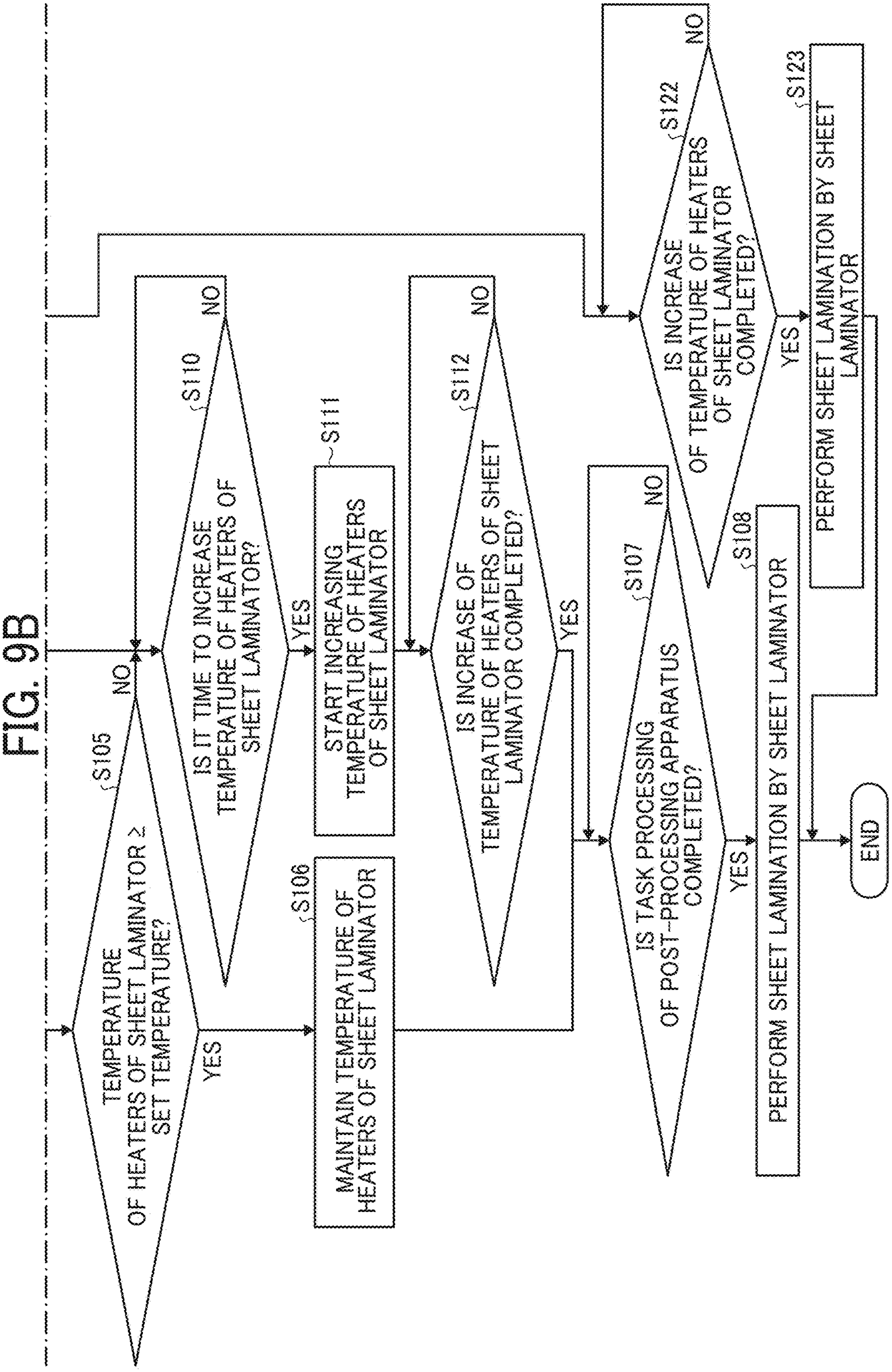

FIG. 9 including FIGS. 9A and 9B is a flowchart of a temperature control of a heater of the sheet laminator in task processing in a post-processing apparatus.

A description is given of the process of each step, with reference to FIG. 9 including FIGS. 9A and 9B.

First, in step S100, when the post-processing apparatus 400 receives an operation command from the control unit (referred to as the controller 127) of the image forming system 500, the post-processing apparatus 400 receives a sheet printed by the image forming apparatus 300 and starts performing a post-processing task.

Then, in step S101, the controller 127 calculates a task time T related to the work in the post-processing apparatus 400 from information such as the number of printed sheets, the printing speed, and the content of the post-processing by a task time calculator. The task time calculator is an information processing program (application program).

Figure 10:
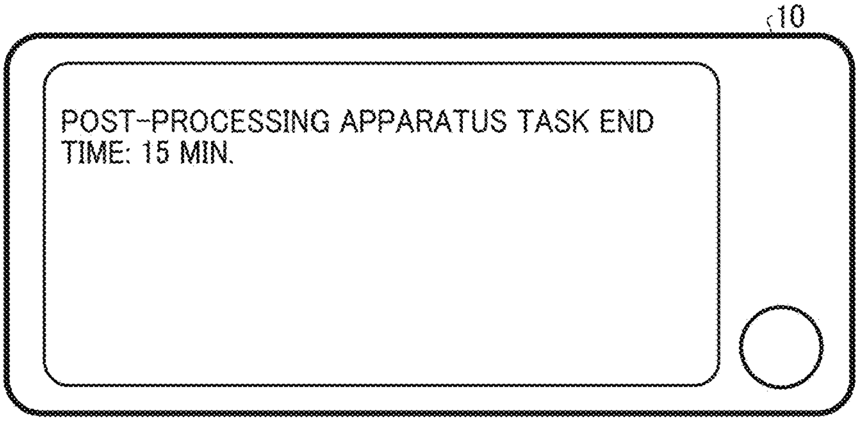
FIG. 10 is an example of a control panel a task time of the post-processing apparatus.

Further in step S101, the task time T of the post-processing apparatus 400 is preferably updated each time in accordance with the states of the image forming apparatus 300 and the post-processing apparatus 400. It is desirable that the task time T calculated by the task time calculator is displayed on, for example, the control panel 10 as illustrated in FIG. 10 so that the user can confirm the task time T.

Subsequently, in step S102, the controller 127 determines whether any command of performing sheet lamination is input to the image forming system 500 during the task of the post-processing apparatus 400. When a command of performing sheet lamination is input to the image forming system 500 during the task of the post-processing apparatus 400 (YES in step S102), the process proceeds to step S103, and the controller 127 selects one of the operation modes of the "productivity mode" and the "energy-saving mode" to perform in the image forming system 500.

The "productivity mode" is a mode in which the productivity is prioritized in order to increase the temperatures of the heaters of the sheet laminator 100 during the task processing in the post-processing apparatus 400. On the other hand, the "energy-saving mode" is a mode in which energy saving (power saving) is prioritized in order not to increase the temperatures of the heaters of the sheet laminator 100 during the task processing of the post-processing apparatus 400.

Figure 11:
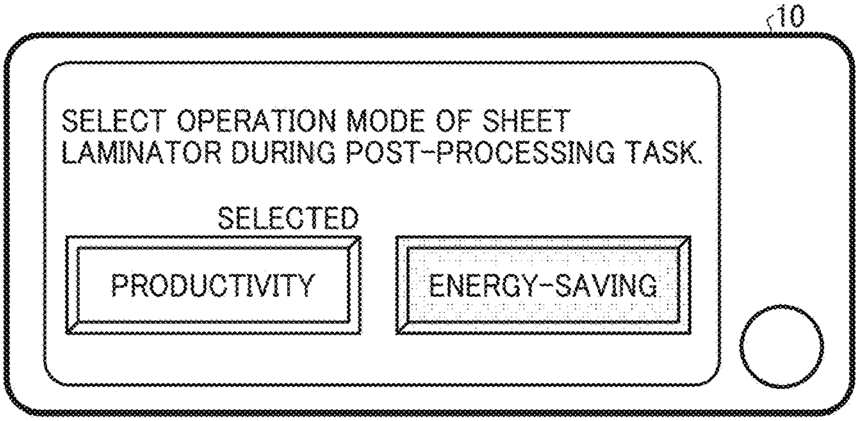
FIG. 11 is an example of the control panel displaying a selection screen of an operation mode.

The selection of these operation modes may be set in advance by the user or may be displayed on, for example, the control panel 10 as illustrated in FIG. 11 at the time when the command of performing the sheet lamination is input to the controller 127, so that the user may set (select) the operation mode each time. Alternatively, the selection of the operation modes may be set via an external device connected via a network.

When the command of performing sheet lamination is not input to the image forming system 500 during the task of the post-processing apparatus 400 (NO in step S102), the process proceeds to step S130. In step S130, the controller 127 causes the post-processing apparatus 400 to continue the task processing.

Productivity Mode

In step S103, when the "productivity mode" is selected, the process proceeds to step S104. In step S104, the controller 127 determines whether the task time T of the post-processing apparatus 400 is equal to or smaller than the determination time N (T≤N).

The determination time N is an index for selecting the operation (the power on or off of the heaters) of the sheet laminator 100 in accordance with the task time T of the post-processing apparatus 400.

When the task time T of the post-processing apparatus 400 is greater than the determination time N (NO in step S104), the controller 127 increases the temperature of each of the heaters of the sheet laminator 100 in accordance with the task time T of the post-processing apparatus 400. In other words, after the heaters are temporarily stopped, the controller 127 increases the temperature (after a given time has elapsed). Specifically, the controller 127 determines whether it is a time to increase the temperature of each of the heaters of the sheet laminator 100 (step S110). When it is not the time to increase the temperature of each of the heaters (NO in step S110), step S110 is repeated until the time to increase the temperature comes. When it is the time to increase the temperature of each of the heaters (YES in step S110), the controller 127 starts increasing the temperature of each of the heaters of the sheet laminator 100 (step S111).

On the other hand, when the task time T of the post-processing apparatus 400 is equal to or smaller than the determination time N (YES in step S104), the controller 127 determines, based on the temperature of each of the heaters of the sheet laminator 100, whether to increase or maintain the temperature of each of the heaters in accordance with the task time T of the post-processing apparatus 400 (steps S105 and S106).

A description is given of the difference in the above-described processes.

When the "productivity mode" is selected, the controller 127 increases the temperature of each of the heaters of the sheet laminator 100 without waiting for completion of the task processing of the post-processing apparatus 400. In a case where it takes a long time until the task processing of the post-processing apparatus 400 is completed (in other words, in a case where the relation of the task time T>the determination time N is satisfied), the temperature of each of the heaters is continuously maintained even though the sheet lamination is not performed. This operation is likely to result in a wasteful consumption of the power. For this reason, it is more efficient that the controller 127 increases the temperature of each of the heaters of the sheet laminator 100 (after the given time has elapsed) in accordance with the task time T of the post-processing apparatus 400.

On the other hand, in a case where it does not take a long time until the task processing of the post-processing apparatus 400 is completed (in other words, in a case where the relation of the task time T≤the determination time N is satisfied), it is more efficient to intermittently increase the temperature of each of the heaters of the sheet laminator 100 and maintain the temperature.

Figure 12:
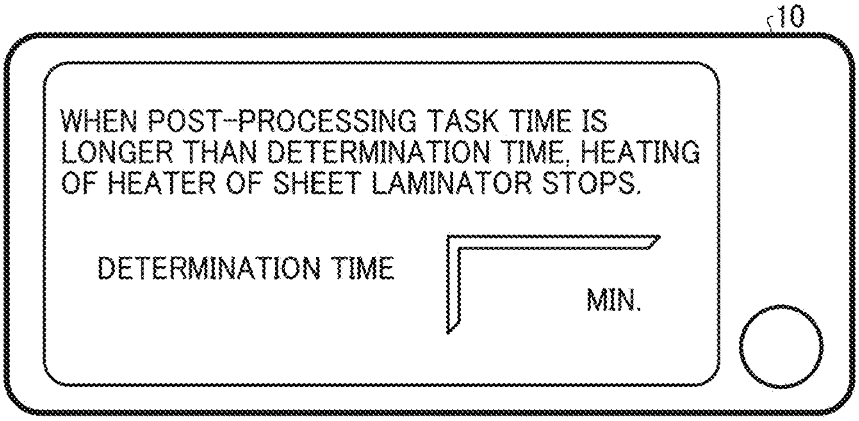
FIG. 12 is an example of the control panel displaying a setting screen of a determination time.

The determination time N may be set in advance, or may be displayed on, for example, the control panel 10 as illustrated in FIG. 12 so that the user can set the determination time N each time.

Referring back to FIGS. 9A and 9B, the description of the flowchart of the processes of the image forming system 500 continues. When the task time T of the post-processing apparatus 400 is greater than the determination time N (NO in step S104), the process goes to step S110. In step S110, the controller 127 calculates a temperature increase start time Ts by subtracting a time Tr for increasing the temperature of each of the heaters of the sheet laminator 100 from the task time T of the post-processing apparatus 400 (Ts=T−Tr). When the time reaches the temperature increase start time Ts, the process goes to step S111 to start increasing the temperature of each of the heaters of the sheet laminator 100.

Then, the process goes to step S112. In step S112, the controller 127 continues to increase the temperature of each of the heaters of sheet laminator 100 until the temperature reaches the increase completed temperature. In other words, the controller 127 determines whether the increase of the temperature of each of the heaters of the sheet laminator 100 is completed. When the controller 127 determines that the temperature of each of the heaters of the sheet laminator 100 is completed (YES in step S112), the process proceeds to step S107. In step S107, the controller 127 waits until the task processing of the post-processing apparatus 400 is completed. In other words, the controller 127 determines whether the task processing of the post-processing apparatus 400 is completed. When the task processing in the post-processing apparatus 400 is not completed (NO in step S107), step S107 is repeated until the task processing in the post-processing apparatus 400 is completed. When the task processing in the post-processing apparatus 400 is completed (YES in step S107), the process proceeds to step S108. In step S108, the controller 127 performs sheet lamination by the sheet laminator 100.

In step S110, the controller 127 calculates the temperature increase start time Ts based on the task time T calculated in step S101 and the time Tr (fixed value) for increasing the temperature of each of the heaters. However, it is also assumed that a deviation occurs in the task time T calculated in step S101 due to a time delay (such as a sheet supply operation or a task stop time) that occurs during the task processing by the post-processing apparatus 400. For this reason, the task time T may be updated each time.

The process returns to step S104 again. In step S104, when the task time T of the post-processing apparatus 400 is equal to or smaller than the determination time N (YES in step S104), the process proceeds to step S105. The controller 127 determines whether the temperature of each of the heaters of the sheet laminator 100 is equal to or greater than the set temperature St (in step S105).

In step S105, when the temperature of each of the heaters of the sheet laminator 100 is equal to or greater than the set temperature St (YES in step S105), the process proceeds to step S106. In step S106, the controller 127 maintains the temperature of each of the heaters of the sheet laminator 100 to be the same as the set temperature St.

On the other hand, in step S105, when the temperature of each of the heaters of the sheet laminator 100 is smaller than the set temperature St (NO in step S105), the process proceeds to step S110. In step S110, the controller 127 increases the temperature of each of the heaters of the sheet laminator 100 in accordance with the task time T of the post-processing apparatus 400.

When the temperature of each of the heaters of the sheet laminator 100 is sufficiently high (in other words, when the temperature of each of the heaters of the sheet laminator 100 is equal to or greater than the set temperature St), performing this process is more efficient to intermittently increase the temperature of each of the heaters of the sheet laminator 100 and maintain the temperature. On the other hand, when the temperature of each of the heaters of the sheet laminator 100 is smaller than the set temperature St, it is more efficient to increase the temperature of each of the heaters of the sheet laminator 100 in accordance with the task time T of the post-processing apparatus 400.

In the present embodiment, the task time T of the post-processing apparatus 400 is compared with the determination time N in step S104, and the temperature of each of the heaters of the sheet laminator 100 is compared with the set temperature St in step S105. However, since the processes of the steps are not changed, the order of these steps can be switched.

In step S106, the temperature of each of the heaters of the sheet laminator 100 is maintained at the set temperature St until the task processing in the post-processing apparatus 400 is completed in step S107. When the task processing in the post-processing apparatus 400 is completed, the process proceeds to step S108 where the controller 127 performs sheet lamination by the sheet laminator 100.

The set temperature St used for the determination may be set in advance or may be selected and determined based on the type of the laminate film used in the sheet laminator 100, the operation specification of the sheet laminator 100, or both.

In step S106, it is desirable to set an upper limit (for example, the upper limit time UT) for the time for which the temperature of each of the heaters of the sheet laminator 100 is maintained, in preparation for a case where a minor abnormality such as a supply replenishment operation to the image forming apparatus 300 and the post-processing apparatus 400 or paper jamming occurs.

Figure 13:
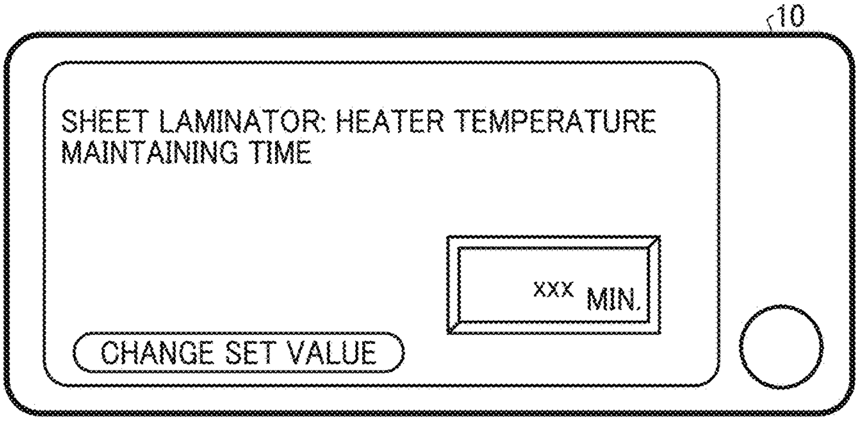
FIG. 13 is an example of the control panel displaying a setting screen of an upper limit time.

As illustrated in FIG. 13, it is desirable that the user or the service person can set the upper limit time UT to any value through, for example, the control panel 10.

In the productivity mode, the temperature of each of the heaters of the sheet laminator 100 is increased or maintained during the task processing in the post-processing apparatus 400. Due to such a configuration, sheet lamination can be performed immediately after the task processing in the post-processing apparatus 400 is completed. As a result, the productivity can be enhanced.

Energy-Saving Mode

In step S103, when the "energy-saving mode" is selected, the process proceeds to step S120. In step S120, the controller 127 waits until the task processing of the post-processing apparatus 400 is completed. In other words, the controller 127 determines whether the task processing of the post-processing apparatus 400 is completed. When the task processing of the post-processing apparatus 400 is not completed (NO in step S120), step S120 is repeated until the task processing of the post-processing apparatus 400 is completed. When the task processing of the post-processing apparatus 400 is completed (YES in step S120), the process proceeds to step S121. In step S121, the controller 127 starts increasing the temperature of each of the heaters of the sheet laminator 100.

Then, the process proceeds to step S122. In step S122, the controller 127 continues to increase the temperature of each of the heaters of sheet laminator 100 until the temperature reaches the increase completed temperature. In other words, the controller 127 determines whether the increase of the temperature of each of the heaters of the sheet laminator 100 is completed. When the task processing of the post-processing apparatus 400 is not completed (NO in step S122), step S122 is repeated until the task processing of the post-processing apparatus 400 is completed. When the task processing of the post-processing apparatus 400 is completed (YES in step S122), the process proceeds to step S123. In step S123, the controller 127 performs sheet lamination by the sheet laminator 100.

In the "power-saving mode", the controller 127 does not increase the temperature of each of the heaters of the sheet laminator 100 until the task processing of the post-processing apparatus 400 is completed. Due to such a configuration, the amount of the power consumption can be reduced.

The image forming system 500 according to the present embodiment can select a mode between the productivity mode that increases the temperature of each of the heaters of the sheet laminator 100 in the task processing of the post-processing apparatus 400 and the energy-saving mode that maintains (does not increase) the temperature of each of the heaters of the sheet laminator 100 in the task processing of the post-processing apparatus 400. As a result, the image forming system 500 according to the present embodiment can have both the productivity and the energy-saving of the sheet laminator 100.

A description is given of some advantageous configurations in some embodiments of the embodiments of the image forming system 500.

In steps S108 and S123, the sheet laminator 100 performs sheet lamination, but the processing time related to the sheet lamination may be displayed on the control panel 10 or a printer setting screen connected to the network.

Due to such a configuration, the user can obtain a rough estimate of the printing operation restart time using the image forming apparatus 300 and the post-processing apparatus 400 after the sheet lamination by the sheet laminator 100. Further, for example, when a task other than sheet lamination is preferably performed, for example, without waiting for completion of the sheet lamination, the determination can be made by temporarily stopping the sheet lamination or outputting the image to another image forming apparatus.

In a case where sheet lamination is stopped once, the process returns to step S100 to continue the processes of the flowchart. For example, when the task is performed by the image forming apparatus 300, the post-processing apparatus 400 described in the flowchart of FIGS. 9A and 9B is replaced with the image forming apparatus 300. The task time calculator of the controller 127 can also calculate the task time T related to the operation in the sheet laminator 100.

Some embodiments of the present disclosure have been described in detail above. The above-described embodiments are examples and can be modified within the scope not departing from the gist of the present disclosure. For example, some embodiments and advantageous configurations may be combined with each other.

The effects obtained by the above-described embodiments are examples. The effects obtained by other embodiments are not limited to the above-described effects.

A description is now given of some aspects of the present disclosure.

Aspect 1

In Aspect 1, an image forming system (for example, the image forming system 500) includes an image forming apparatus (for example, the image forming apparatus 300), a sheet laminator (for example, the sheet laminator 100), a post-processing apparatus (for example, the post-processing apparatus 400), and circuitry (for example, the controller 127). The sheet laminator includes a heater (for example, the heater 123) and applies heat and pressure on a two-ply sheet (for example, the lamination sheet S) in which a sheet medium (for example, the inner sheet P) is inserted while conveying the two-ply sheet. The circuitry is to calculate a task time (for example, the task time T) of the post-processing apparatus, adjust a temperature of the heater of the sheet laminator, and select one of a productivity mode in which the temperature of the heater of the sheet laminator is increased while the post-processing apparatus performs a task and an energy-saving mode in which the temperature of the heater of the sheet laminator is maintained while the post-processing apparatus perform the task.

Aspect 2

In Aspect 2, in the image forming system according to Aspect 1, the circuitry is to increase the temperature of the heater of the sheet laminator when the task time of the post-processing apparatus is longer than a given determination time, and maintain the temperature of the heater of the sheet laminator when the task time of the post-processing apparatus is equal to or smaller than the given determination time, in the productivity mode.

Aspect 3

In Aspect 3, in the image forming system according to Aspect 2, the circuitry is to set the given determination time to a desired number.

Aspect 4

In Aspect 4, in the image forming system according to Aspect 2 or 3, the circuitry is to increase the temperature of the heater of the sheet laminator when the task time of the post-processing apparatus is equal to or smaller than the given determination time and the temperature of the heater of the sheet laminator is smaller than a set temperature, and maintain the temperature of the heater of the sheet laminator when the task time of the post-processing apparatus is equal to or smaller than the given determination time and the temperature of the heater of the sheet laminator is equal to or greater than the set temperature.

Aspect 5

In Aspect 5, in the image forming system according to any one of Aspects 2 to 4, the heater has an upper limit time (for example, the upper limit time UT) to maintain the temperature. The circuitry is to stop maintaining the temperature of the heater when the heater reaches the upper limit time.

Aspect 6

In Aspect 6, in the image forming system according to any one of Aspects 1 to 5, the circuitry is to subtract a time (for example, the time Tr) to increase the temperature of the heater of the sheet laminator from the task time of the post-processing apparatus to calculate a start time (for example, the temperature increase start time Ts) to increase the temperature of the heater of the sheet laminator, in the productivity mode.

Aspect 7

In Aspect 7, an image forming system (for example, the image forming system 500) includes an image forming apparatus (for example, the image forming apparatus 300), a sheet laminator (for example, the sheet laminator 100), a post-processing apparatus (for example, the post-processing apparatus 400), and circuitry (for example, the controller 127). The sheet laminator includes a heater (for example, the heater 123) and applies heat and pressure on a two-ply sheet (for example, the lamination sheet S) in which a sheet medium (for example, the inner sheet P) is inserted while conveying the two-ply sheet. The post-processing apparatus performs a task. The circuitry is to calculate a task time (for example, the task time T) taken for the task performed by the post-processing apparatus, and perform one of increasing a temperature of the heater of the sheet laminator while the post-processing apparatus performs the task, or maintaining the temperature of the heater of the sheet laminator while the post-processing apparatus performs the task, based on the task time in a productivity mode.

Aspect 8

In Aspect 8, in the image forming system according to Aspect 7, the circuitry is further to wait for increasing the temperature of the heater of the sheet laminator until a completion of the task performed by the post-processing apparatus in an energy-saving mode.

Aspect 9

In Aspect 9, in the image forming system according to Aspect 7, the circuitry is further to increase the temperature of the heater of the sheet laminator when the task time of the post-processing apparatus is longer than a given determination time, and maintain the temperature of the heater of the sheet laminator when the task time of the post-processing apparatus is equal to or smaller than the given determination time, in the productivity mode.

Aspect 10

In Aspect 10, in the image forming system according to Aspect 8, the circuitry is further to set the given determination time in advance, or receive the given determination time from a control panel.

Aspect 11

In Aspect 11, in the image forming system according to Aspect 8 or 9, the circuitry is further to increase the temperature of the heater of the sheet laminator when the task time of the post-processing apparatus is equal to or smaller than the given determination time and when the temperature of the heater of the sheet laminator is smaller than a set temperature, and maintain the temperature of the heater of the sheet laminator when the task time of the post-processing apparatus is equal to or smaller than the given determination time and when the temperature of the heater of the sheet laminator is equal to or greater than the set temperature, in the productivity mode.

Aspect 12

In Aspect 12, in the image forming system according to Aspect 11, the circuitry is further to maintain the temperature of the heater equal to or below an upper limit time (for example, the upper limit time UT), and stop maintaining the temperature of the heater when the heater reaches the upper limit time.

Aspect 13

In Aspect 13, in the image forming system according to any one of Aspects 7 to 12, when the task time of the post-processing apparatus is longer than a given determination time, the circuitry is to subtract a time (for example, the time Tr) taken for increasing the temperature of the heater of the sheet laminator from the task time of the post-processing apparatus to calculate a start time (for example, the temperature increase start time Ts) to increase the temperature of the heater of the sheet laminator, in the productivity mode.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image forming system comprising:
an image forming apparatus;
a sheet laminator including a heater, the sheet laminator configured to apply heat and pressure on a two-ply sheet in which a sheet medium is inserted while conveying the two-ply sheet;
a post-processing apparatus configured to perform a task; and
circuitry configured to,
calculate a task time taken for the task performed by the post-processing apparatus; and
perform at least one of,
increasing a temperature of the heater of the sheet laminator while the post-processing apparatus performs the task; or
maintaining the temperature of the heater of the sheet laminator while the post-processing apparatus performs the task,
based on the task time in a productivity mode.

2. The image forming system according to claim 1, wherein the circuitry is further configured to wait for increasing the temperature of the heater of the sheet laminator until a completion of the task performed by the post-processing apparatus in an energy-saving mode.

3. The image forming system according to claim 1, wherein the circuitry is further configured to:
increase the temperature of the heater of the sheet laminator in response to the task time of the post-processing apparatus being longer than a given determination time; and
maintain the temperature of the heater of the sheet laminator in response to the task time of the post-processing apparatus being equal to or smaller than the given determination time,
in the productivity mode.

4. The image forming system according to claim 3, wherein the circuitry is further configured to:
set the given determination time in advance, or
receive the given determination time from a control panel.

5. The image forming system according to claim 3, wherein the circuitry is further configured to:
increase the temperature of the heater of the sheet laminator,
in response to the task time of the post-processing apparatus being equal to or smaller than the given determination time; and
in response to the temperature of the heater of the sheet laminator being smaller than a set temperature; and
maintain the temperature of the heater of the sheet laminator,
in response to the task time of the post-processing apparatus being equal to or smaller than the given determination time; and
in response to the temperature of the heater of the sheet laminator being equal to or greater than the set temperature,
in the productivity mode.

6. The image forming system according to claim 5, wherein the circuitry is further configured to:
set a time to maintain the temperature of the heater, the time being set equal to or below an upper limit time; and
stop maintaining the temperature of the heater in response to the time reaching the upper limit time.

7. The image forming system according to claim 1, wherein, in response to the task time of the post-processing apparatus being longer than a given determination time,
the circuitry is configured to subtract a time taken for increasing the temperature of the heater of the sheet laminator from the task time of the post-processing apparatus to calculate a start time to increase the temperature of the heater of the sheet laminator,
in the productivity mode.

8. An image forming system comprising:
an image forming apparatus;
a sheet laminator including a heater, the sheet laminator configured to apply heat and pressure on a two-ply sheet in which a sheet medium is inserted while conveying the two-ply sheet;

a post-processing apparatus configured to perform a task; and circuitry configured to, calculate a task time taken for the task performed by the post-processing apparatus; and perform at least one of, increasing a temperature of the heater of the sheet laminator while the post-processing apparatus performs the task; or maintaining the temperature of the heater of the sheet laminator while the post-processing apparatus performs the task, based on the task time in a productivity mode, wherein, in the productivity mode, the circuitry is further configured to, increase the temperature of the heater of the sheet laminator in response to the task time of the post-processing apparatus being longer than a given determination time, maintain the temperature of the heater of the sheet laminator in response to the task time of the post-processing apparatus being equal to or smaller than the given determination time, increase the temperature of the heater of the sheet laminator, in response to the task time of the post-processing apparatus being equal to or smaller than the given determination time, and in response to the temperature of the heater of the sheet laminator being smaller than a set temperature, maintain the temperature of the heater of the sheet laminator, in response to the task time of the post-processing apparatus being equal to or smaller than the given determination time, and in response to the temperature of the heater of the sheet laminator being equal to or greater than the set temperature, set a time to maintain the temperature of the heater, the time being set equal to or below an upper limit time, and stop maintaining the temperature of the heater in response to the time reaching the upper limit time.

* * * * *